(12) United States Patent
Malenfant et al.

(10) Patent No.: US 7,044,165 B2
(45) Date of Patent: May 16, 2006

(54) OUTFLOW REGULATOR FOR A GRAVITY-FED LIQUID OUTLET

(75) Inventors: Marc-André Malenfant, St-Modeste (CA); Yves Bérubé, Notre-Dame-Du-Portage (CA); Nicolas Viel, Riviére-du-Loup (CA); Jean-Pierre Dautais, Basse Goulaine (FR)

(73) Assignee: Premier Tech Technologies Ltd., Quebec (CA)

( * ) Notice: Subject to any disclaimer, the term of this patent is extended or adjusted under 35 U.S.C. 154(b) by 0 days.

(21) Appl. No.: 11/203,426

(22) Filed: Aug. 15, 2005

(65) Prior Publication Data

US 2006/0032544 A1 Feb. 16, 2006

(30) Foreign Application Priority Data

Aug. 16, 2004 (CA) .................................. 2477638

(51) Int. Cl.
*F15D 1/00* (2006.01)
*E02B 7/40* (2006.01)

(52) U.S. Cl. .................... 138/46; 138/45; 137/448; 137/436

(58) Field of Classification Search ................ 138/46, 138/43, 45, 37; 137/448, 436, 420, 421
See application file for complete search history.

(56) References Cited

U.S. PATENT DOCUMENTS

| | | | | |
|---|---|---|---|---|
| 187,181 A | * | 2/1877 | Schmitz ..................... 210/116 |
| 199,696 A | * | 1/1878 | Dikeman ..................... 137/409 |
| 386,242 A | * | 7/1888 | Fry ............................. 137/448 |
| 581,538 A | * | 4/1897 | Dean ........................... 405/93 |
| 1,354,879 A | * | 10/1920 | Boland ........................ 210/123 |
| 1,612,195 A | * | 12/1926 | Kirchhan et al. ........... 137/445 |
| 1,864,443 A | * | 6/1932 | Khun .......................... 137/445 |
| 1,969,427 A | * | 8/1934 | Sander ........................ 137/389 |
| 2,259,128 A | * | 10/1941 | Egan .......................... 137/877 |
| 2,303,808 A | * | 12/1942 | Wolcott ....................... 210/119 |
| 2,928,410 A | * | 3/1960 | Del Vecchio .......... 137/115.02 |
| 3,428,078 A | * | 2/1969 | James ......................... 137/416 |
| 4,091,624 A | * | 5/1978 | Steinke ....................... 405/96 |
| 4,324,506 A | * | 4/1982 | Steinke ....................... 405/96 |
| 4,582,083 A | | 4/1986 | Steinhardt .................. 137/398 |
| 5,141,644 A | | 8/1992 | Forde ....................... 210/512.1 |
| 6,779,947 B1 | * | 8/2004 | Buchanan et al. ............ 405/99 |

FOREIGN PATENT DOCUMENTS

EP   0396129   7/1990

* cited by examiner

*Primary Examiner*—Patrick Brinson
(74) *Attorney, Agent, or Firm*—Lowe, Hauptman & Berner, LLP; William E. Beaumont (57) ABSTRACT

An outflow regulator for a gravity-fed liquid outlet of a liquid reservoir comprising a restriction plate mountable within the liquid outlet for limiting a flow rate of an effluent. The restriction plate allows a lower passage for the effluent when a first level of liquid is reached within the liquid reservoir, and an upper passage for the effluent when a second level of liquid is reached. The regulator also comprises a flapgate pivotable between a closed position where the flapgate covers the lower passage of the restriction device and an open position away from the restriction plate. When the flapgate is in the closed position, the effluent is free to flow out though the upper passage. A float counterweight switches the flapgate between the opened position and closed position according to the liquid level in the reservoir.

16 Claims, 7 Drawing Sheets

OUTFLOW REGULATOR FOR A GRAVITY-FED LIQUID OUTLET

FIELD OF THE INVENTION

This invention relates generally to the control of liquid. More particularly, it concerns an outflow regulator for a gravity-fed liquid outlet of a liquid reservoir, for providing damping effects on hydraulic events and even distribution of the effluent. The outflow regulator is suitable for controlling the outflow of any gravity-fed liquid outlet. More preferably, it is suitable for regulating the flow rate of a septic tank effluent or for regulating the flow rate of multi-compartment reservoirs.

BACKGROUND OF THE INVENTION

Depending on the intended use of a reservoir containing a liquid, one may wish to regulate the flow rate of the reservoir effluent. As for example, one may wish to regulate the flow rate of a septic tank effluent, septic tanks being widely used in industrialized countries, or the flow rate between the compartments of a multi-compartment reservoir.

With regards to onsite wastewater systems using septic tanks as primary treatment combined with secondary treatment technology, it is interesting to note that, in 1990 in the USA, 24.7 million houses had an onsite wastewater system including a septic tank, which represents 25% of the American population. Recent studies predict that the number of dwellings using this type of wastewater treatment will reach 37 million within 20 years. Moreover, 33% of new constructions will probably rely on decentralized wastewater treatment. In France, over 10 million people depend on onsite systems to treat wastewater and 95% of these systems use a septic tank as primary treatment. In the province of Quebec (Canada), nearly 650,000 homes have this type of wastewater treatment system, which represents 20% of the provincial population.

Although septic tanks have been widely used in North America and Europe for decades, they are not very efficient treatment systems and may have significant environmental impact. In fact, the septic tank in its current form can cause major problems by ground water contamination. For example, in the USA in 1996, 50% of septic tanks contaminated groundwater due to poor design, construction, maintenance and functioning (Miller and Little, 1996). Moreover, EPA cited that regarding the 1995 National Shellfish Register, the third common pollution source for shellfish restriction were septic tanks (32%) after urban runoff (40%) and unidentified upstream sources (39%). Problems were caused by tank leakage and by overloading the leaching field as a result of poor performance.

Over past decades, septic tank configuration has not changed much and has not been a source of increases in performance. A few modifications have been brought to the inlet and outlet devices (baffle, tees and effluent filters) but these have not had a major impact on the hydraulic functioning of septic tanks. For example, outlet devices improve scum retention and the effluent filter acts as a fuse when the septic tank is stressed by a hydraulic event. However, the devices currently available do not enhance the sedimentation capacity of the septic tank. During hydraulic events (draining of bath tub, washing machine, etc.), which are the feeding mode of residential septic tanks, incoming solids do not have sufficient time to settle. The sludge accumulated at the bottom of the tank may also be disturbed, re-suspended and drawn into the effluent. When such solids are discharged into the downstream treatment system (leaching field, aerobic treatment unit, etc.) the efficiency and/or lifespan of the latter will decrease.

There is still presently an unresolved problem in the field of septic tanks, which problem is a consequence of the important flow rate fluctuation of the influent and effluent. There is thus presently a need for a flow regulator that will reduce the unwished effects of the effluent peak flow.

Generally speaking, it would also be very advantageous to make available on the market a simple outflow regulator that is inexpensive to make and use, and that do not need any complex hydraulic or electric components.

SUMMARY OF THE INVENTION

An object of the present invention is to provide an outflow regulator that satisfies at least one of the above-mentioned needs.

Accordingly, the present invention provides an outflow regulator for a gravity-fed liquid outlet of a liquid reservoir, the liquid outlet being located in the reservoir so as to be crossed by a liquid effluent flowing in a generally horizontal direction from an upstream side of the outlet to a downstream side. The outflow regulator comprises:

a restriction plate mountable within the liquid outlet for limiting a flow rate of the effluent, the restriction device comprising:
  a lower orifice allowing a first passage for the effluent when a first predetermined level of liquid is reached within the liquid reservoir; and
  an upper orifice located above the first orifice and allowing a second passage for the effluent when a second predetermined level of liquid is reached within the reservoir; and
a closure device comprising:
  a flapgate extending on the downstream side of the restriction plate, the flapgate being pivotable between a closed position where the flapgate covers the lower orifice of the restriction device and an opened position away from the restriction device, the flapgate including an opening facing the upper orifice of the restriction plate when the flapgate is in the closed position; whereby the flapgate, in the closed position, closes the first passage and leaves the second passage free; and
  a float counterweight operatively connected to the flapgate to urge the flapgate towards the opened position when the liquid level in the reservoir is lower than said second predetermined level and causing the flapgate to move to the closed position when the liquid level in the reservoir reaches the second predetermined level.

Preferably, the float counterweight comprises a lever extending substantially at right angle to the flapgate, the lever having a downstream end portion secured to a top portion of the flapgate and an upstream end portion provided with a float.

Preferably, the outflow regulator is used in combination with a filter unit mountable within the liquid outlet of the reservoir for filtering the effluent.

According to another aspect of the invention, there is also provided a filter unit for filtering an effluent in a gravity-fed liquid outlet of a liquid reservoir, comprising an outflow regulator as previously defined. More specifically, the filter unit comprises:

a liquid inlet for receiving liquid to be filtered;

a filter chamber in communication with the liquid inlet for filtering the liquid;

a liquid outlet in communication with the filter chamber from which the filtered liquid exit; and an outflow regulator as described above, mounted within the liquid outlet.

Still, according to the present invention, there is also provided a method for regulating a liquid outflow for a gravity-fed liquid outlet of a liquid reservoir, the liquid outlet being located in the reservoir so as to be crossed by a liquid effluent flowing in a generally horizontal direction from an upstream side of the outlet to a downstream side, the method comprising the steps of:

a) mounting a restriction device within the liquid outlet for limiting a flow rate of the effluent, the restriction device comprising:

a lower orifice allowing a first passage for the liquid when a first predetermined level of liquid is reached within the liquid reservoir; and an upper orifice located above the lower orifice and allowing a second passage for the effluent when a second predetermined level of liquid is reached within the reservoir;

b) allowing the effluent to pass through the first orifice when the liquid level in the reservoir is lower than the second predetermined level;

c) closing the first orifice when the second predetermined level is reached within the reservoir and leaving the second passage free; and d) opening the first orifice when the liquid level in the reservoir is lower than second predetermined level.

The outflow regulator may be advantageously used for regulating an effluent outflowing from a septic tank.

BRIEF DESCRIPTION OF THE DRAWINGS

These and other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

Figure 1:
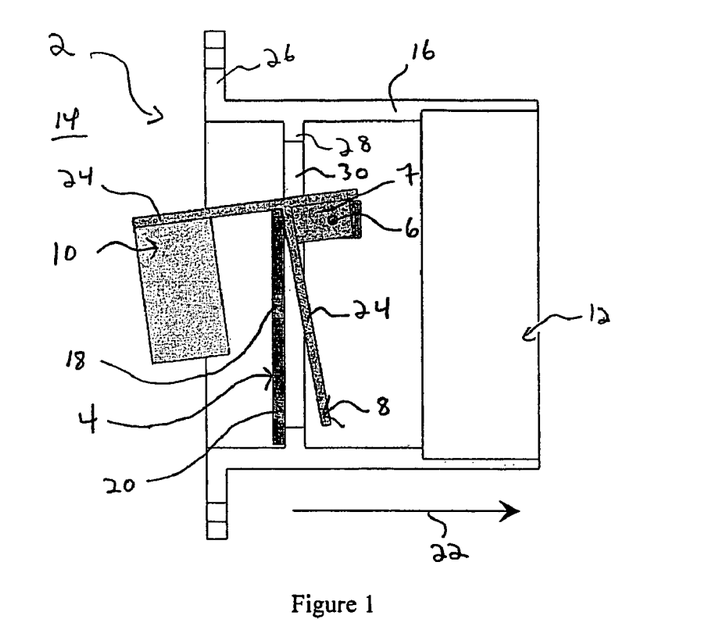
FIG. 1 is a cross section view of an outflow regulator according to a preferred embodiment of the invention comprising a hollow adapter mountable in the liquid outlet of a reservoir, the regulator being shown in an opened position.

Referring to FIG. 1, the outflow regulator 2 according to the invention is intended to be used in a gravity-fed liquid outlet of a liquid reservoir of the type having its liquid outlet located in the reservoir so as to be crossed by a liquid effluent 22 flowing in a generally horizontal direction from an upstream side 14 of the outlet to a downstream side 12. The liquid reservoir can be for example the liquid of a septic tank. It is worth mentioning that although the liquid reservoir is not illustrated as such in the figures, the numeral reference 14 is used to generally identify the inside of the reservoir.

Figure 2:
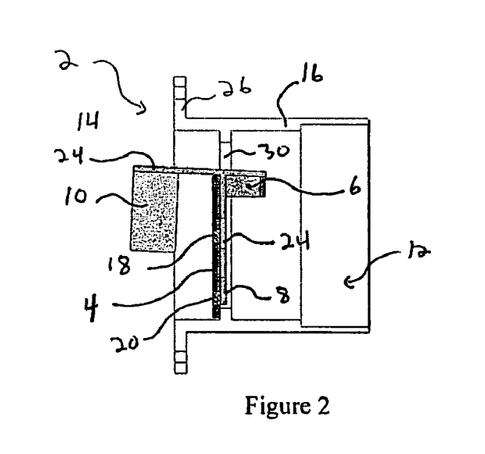
FIG. 2 is the same view as FIG. 1 showing the regulator in a closed position.
Figure 3:
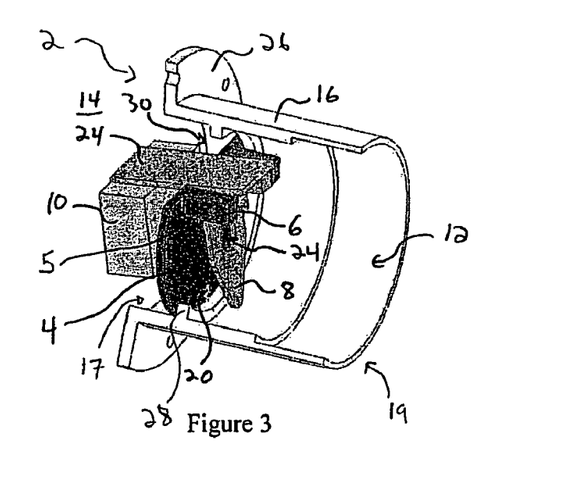
FIG. 3 is a perspective view of the regulator shown in FIG. 1.
Figure 8:
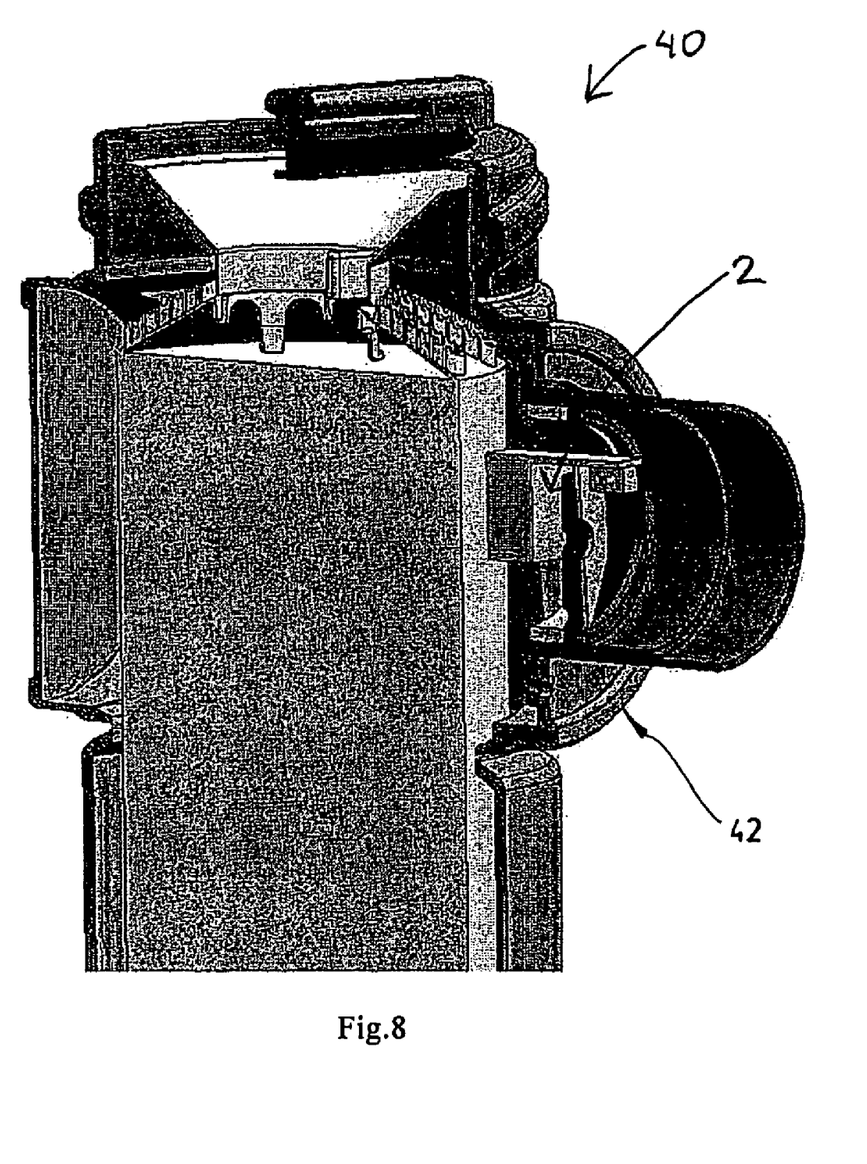
FIG. 8 is a schematic cross-sectional perspective view of the upper portion of a filter unit in combination with a regulator as shown in FIG. 1.

Referring to FIGS. 1 to 4, the outflow regulator according to a preferred embodiment comprises four elements, namely a restriction plate 4, a pivot axis 6, a flapgate 8 and a float 10. Such a regulator 2 can be mounted directly in the outlet of the reservoir such as the outlet of a septic tank or, as shown in FIGS. 1 to 3, it can be integrated into a rigid adapter 16 sized to snugly fit within the liquid outlet of the reservoir. Referring to FIG. 8, the regulator 2 may also preferably be integrated into the liquid outlet 42 of an effluent filter 40. Examples of effluent filters into which the regulator 2 of the present invention may be integrated can be found in U.S. Pat. No. 4,710,295; U.S. Pat. No. 4,439,323; U.S. Pat. No. 5,492,635; U.S. Pat. No. 5,580,453; U.S. Pat. No. 5,382,357; U.S. Pat. No. 5,482,621; and EP 1,265,686.

As best shown in FIG. 3, the adapter 16 is preferably a hollow cylinder that snugly fits within the liquid outlet of the reservoir (not illustrated) with the flow direction of the effluent being depicted by arrow 22, in FIG. 1. The adapter 16 has a first end 17 for receiving the effluent to be regulated, and a second end 19 from which the regulated effluent exite. Preferably, the first end 17 of the adapter 16 is provided with an outer rim 26 so as to abut against the side wall of the reservoir to ensure water tightness. The adapter 16 also has an inner wall provided with a peripheral rim 28, for mounting the restriction plate 4 therein. The restriction plate 4 indeed has a peripheral edge abutting against the peripheral rim 28.

Referring to FIGS. 1 to 4, the restriction plate 4 comprises a lower orifice 20 allowing a first passage for the effluent when a first predetermined level of liquid is reached within the liquid reservoir 14. An upper orifice 18 is located on the restriction plate 4 above the lower orifice 20 to allow a second passage for the effluent when a second predetermined level of liquid is reached within the reservoir 14.

The flapgate 8 extends on the downstream side of the restriction plate 4. The flapgate 8 has a top portion pivotable about a top edge portion of the restriction plate 4 between a closed position (shown in FIG. 2), where the flapgate 8 covers the lower orifice 20 of the restriction plate 4, and an open position (shown in FIGS. 1 and 3) away from the restriction plate 4. The flapgate 8 has an opening 24 positioned so as to face the upper orifice 18 of the restriction plate 4 when the flapgate 8 is in the closed position so as to close the first passage and leave the second passage free. The flapgate 8 is preferably mounted to the restriction plate 4, as in the preferred embodiment illustrated. It is however worth noting that without departing from the scope of the invention, the flapgate 8 can advantageously be pivotally mounted to a rod extending over the restriction plate 4. Such rod could be connected to the inner wall of the adaptor 16.

The float 10 is operatively connected to the flapgate 8 through a lever 24 extending substantially at right angle to the flapgate 8. Together, the float 10 and the lever 24 form a float counterweight. The lever 24 has a downstream end portion secured to the top portion of the flapgate 8 and an upstream end provided with the float 10. By floating up, when the liquid level in the reservoir 14 reaches the second predetermined level, the float 10 causes the flapgate 8 to move to the closed position. By floating down, when the liquid level in the reservoir 14 becomes lower than the second predetermined level, the float 10 urges the flapgate 8 towards the open position. The float counterweight and the flapgate 8 act as a closure device for closing the lower orifice 18 of the restriction plate 4.

Preferably, in order to increase the lever arm effect of the float 10 and, thus to improve the stability of the opened position of the flapgate, the pivot axis is distant from the longitudinal axis of the flapgate, as best viewed from FIG. 1. More particularly, the restriction plate 4 is preferably provided with a pair of spaced apart projecting arms 5 projecting from the upper end portion of the restriction plate 4 on the downstream side thereof, and the lever 24 has an extension 7 pivotally connected between the projecting arms by means of the pivot pin 6.

The restriction plate 4 controls the flow of the liquid (effluent) through the lower and upper orifices 18, 20, and such depending on the upstream effluent level. An additional flow rate is obtained in the upper orifice 18 when the lower orifice 20 is closed. This phenomenon is achieved by moving the flapgate 8, which pivots around its pivot axis 6, thus obstructing the lower orifice 20. The flapgate 8 moves when the upstream effluent level rises, which in turn raises the float counterweight 10 located at an extremity of the lever 24.

Preferably, the restriction plate 4 is sized so as to leave an overflow passage 30 over its top edge for the effluent when the liquid level within the reservoir 14 is higher than the top edge of the restriction plate 4. This overflow passage 30 provides an overflow zone in cases the reservoir capacity is exceeded.

Mode of Operation

Now referring to FIGS. 4A, 4B, 4C, 4D, 4E and 4F, the regulator 2 allows to obtain a regulated downstream flow rate (effluent). Thus, the sudden replenishment of a considerable amount of liquid in the reservoir would be a typical situation that the aforementioned regulator 2 could manage.

Figure 4A:
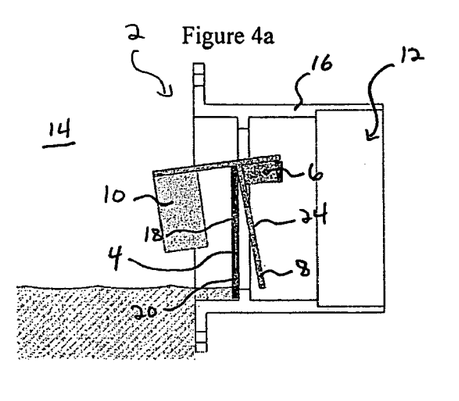
FIGS. 4A to 4F are different cross section views of the regulator of FIG. 1, showing its different operating positions when a hydraulic event occurs.

The sequence begins with an open flapgate 8 (see FIG. 4A). This equilibrated position can be obtained solely by the weight of the float or, according to the preferred embodiment illustrated, it can be assured by the retreat of the pivot axis 6 in respect of the center of mass of the mobile portion of the regulator 2. The liquid level is located at the base of the lower orifice 20. No flow of effluent occurs when the reservoir is to be replenished.

Figure 4B:
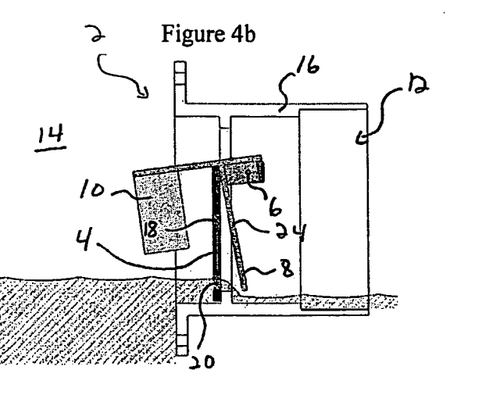

The sudden replenishment of liquid in the reservoir implies an elevation in the level of liquid, and when that liquid is at a certain height, it may freely flow through the lower orifice (see FIG. 4B). If, as mentioned hereinabove, the reservoir is being replenished (filled) more quickly than the exit flow rate, then the liquid level continuously rises. The effluent flow rate is considered to be free flowing until the lower orifice is completely submerged in liquid.

Figure 4C:
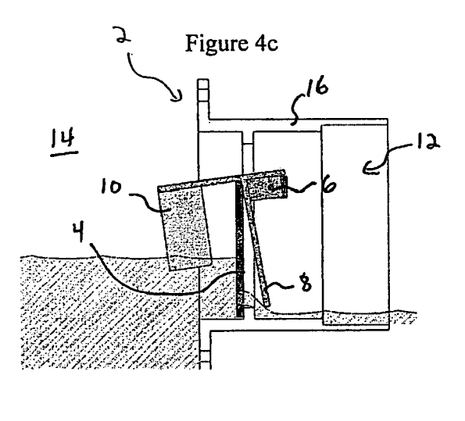

It should be noted that once the level of liquid is above the lower orifice 20 (see FIG. 4C), the effluent flow rate is determined by the following equation:

$$Q = kA(2gh)^{1/2}$$

wherein
  Q=flow rate
    k=the orifice coefficient
    A=the orifice area
    g=gravity
    h=difference of height between the liquid level and the center of the orifice.

When the inlet (feed) flow rate is superior to the effluent flow rate, the liquid level in the reservoir 14 continues to rise. Once the liquid level rises and attains the float 10, it progressively cancels the float weight, thus activating the flapgate 8.

Figure 4D:
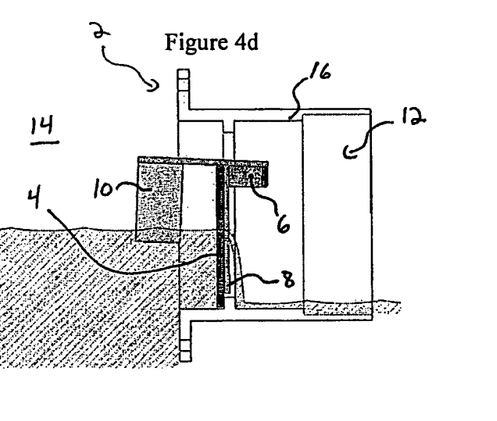

When the downward thrust generated by the weight of the float 10 and the lever 24 is completely nullified by the up thrust buoyancy effect, such buoyancy provokes the displacement of the flapgate 8 in the closed position, as shown in FIG. 4D. The float 10 rises according to the liquid level and this in turn moves the flapgate in such a way so as to obstruct the lower orifice 20 (see FIG. 4D). Run-off occurs, though this time at the upper orifice 18.

Figure 4E:
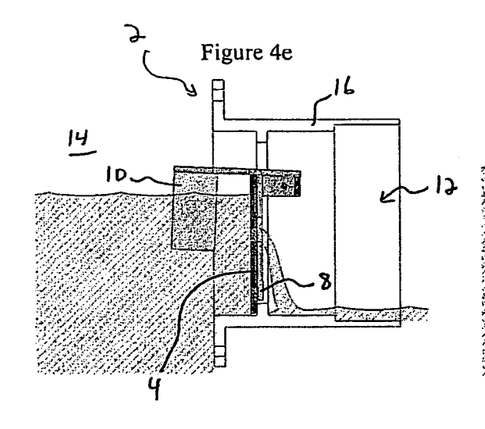
Figure 4F:
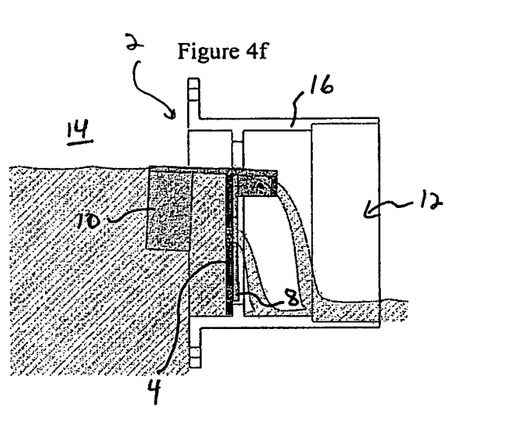

The elevation of the liquid level is a result of a run-off, which respects the orifice equation from the upper orifice 18 (see FIG. 4E). The design of the device according to a preferred embodiment of the invention enables the upper portion of the rigid adapter to allow run-off (see FIG. 4F) through the orifice 30. The regulator 2 was designed in such a way so as to keep in mind the fact that the reservoir may become too full (i.e. overflow).

The regulator 2 is preferably designed for conduits having a 100 mm diameter and for allowing an accumulation of 70 mm of liquid before overflow. The orifices are preferably located 30 mm from one another and have a suitable diameter so as to have a maximum flow rate of 3 L/min before the overflow occurs.

Advantageously, in another preferred embodiment (not illustrated), the restriction device comprises more that two orifices, which allow for a better control of the flow rate. The present invention can also be used for certain conduits of varying diameter and of different sections. It is also suitable for use with multi-compartmental reservoirs. In the latter case, the flow rate can be controlled in such a way so as to transfer liquid from one compartment to another.

Experimental Validation

Figure 5:
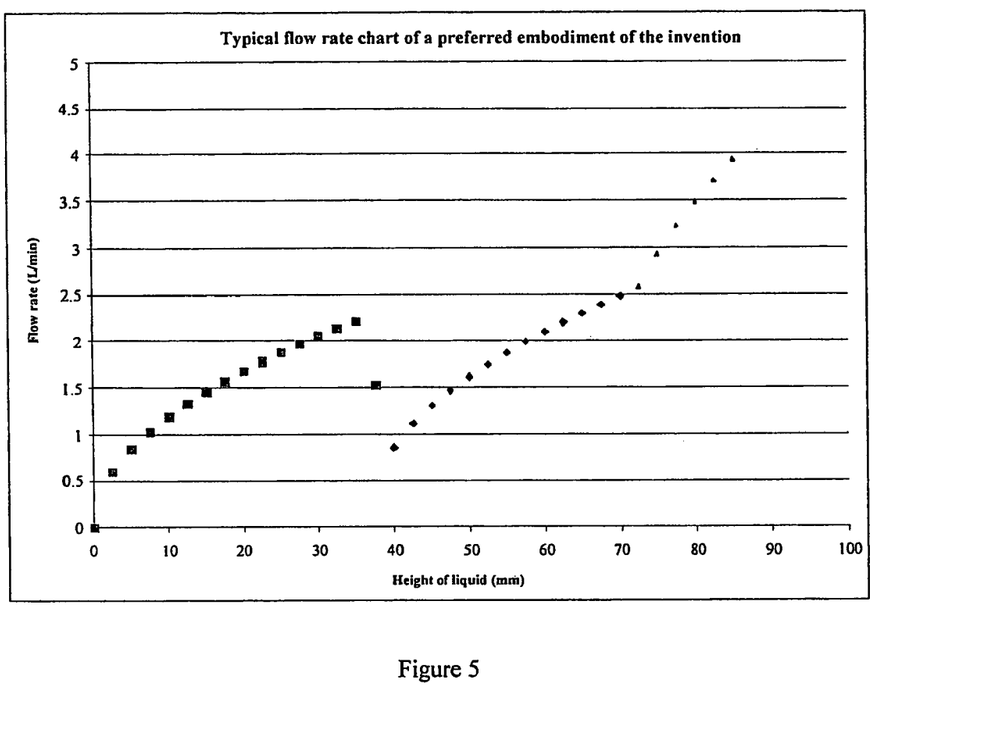
FIG. 5 is a graph of the experimental data obtained from a test conducted using a flow regulator according to the invention, showing the relationship between the level of liquid related to the invert of the lower orifice within the reservoir and the flow rate of the effluent outflowing from the liquid outlet.

The flow rate graph of FIG. 5, associated with the regulator provided with the lower and upper orifices, comprises three sections. The first two sections show the run-off (flow rate) of the two orifices. The point of inflexion, representing the closure of the flapgate 8, is at a height of 35 mm. At liquid levels above 70 mm, the flow rate rapidly increases when the reservoir is too full.

Figure 6:
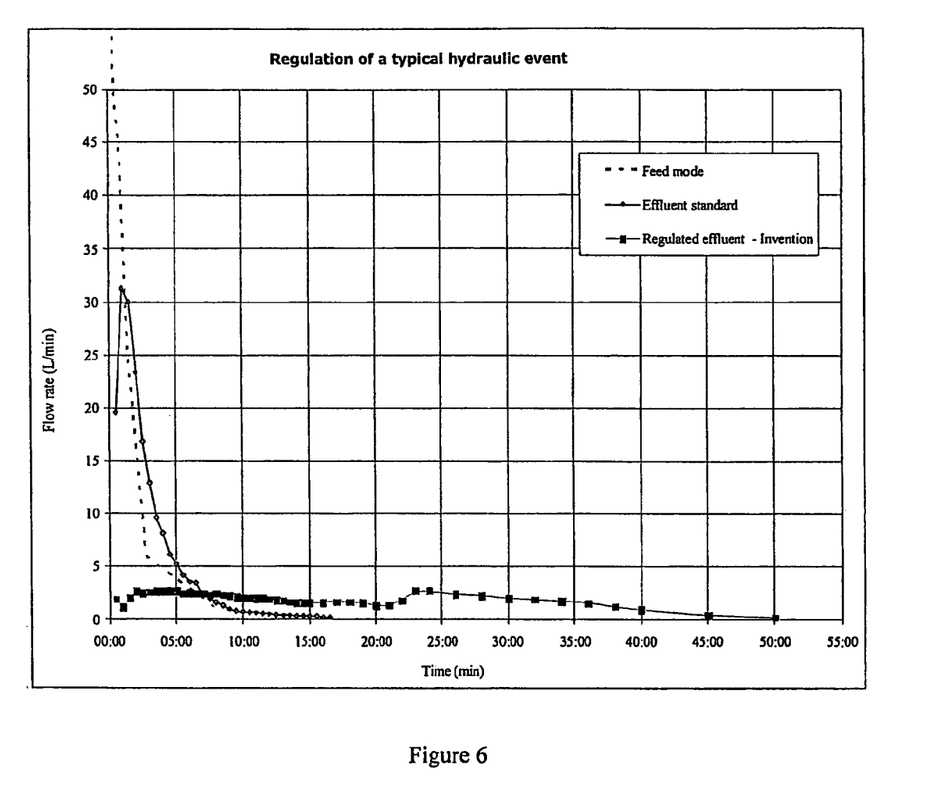
FIG. 6 is a graph showing the fluctuation of the flow rate of the effluent of a standard effluent compared with an effluent regulated with a regulator according to the invention.
Figure 7:
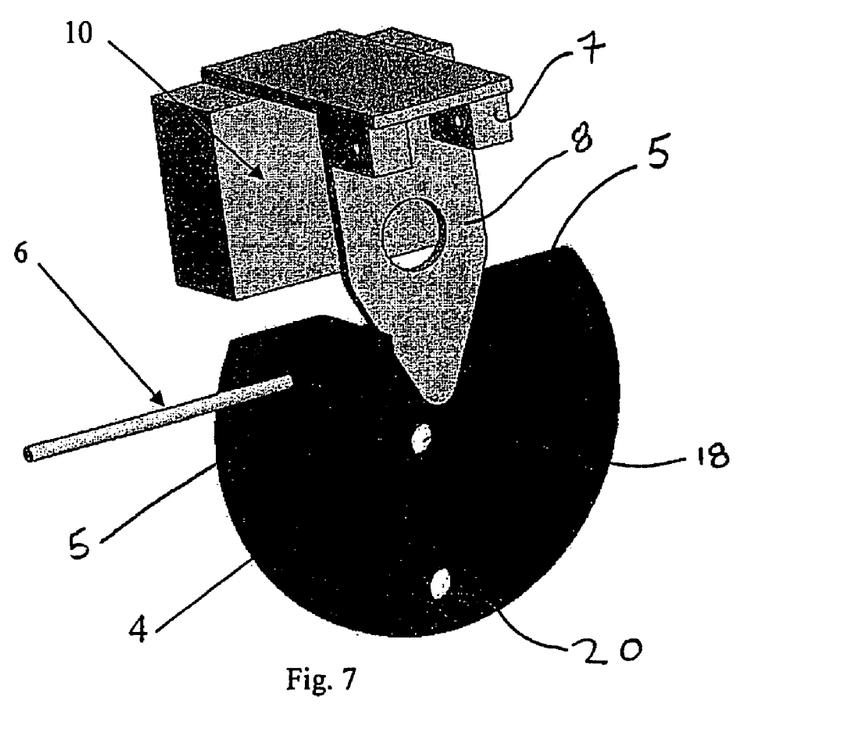
FIG. 7 is an exploded view of the regulator shown in FIG. 1.

FIG. 6 represents the quality of the flow rate regulation with a reservoir of a conventional septic tank being filled in less than 5 minutes with 100 L of liquid. From the standard effluent graph (standard 100 mm in diameter outlet device), no regulation occurs, the curve rapidly increases until a flow rate of 31 L/min is achieved. Afterwards, a balanced regime is produced and a flow-rate of effluent equivalent to the reservoir fill rate is observed. The hydraulic event finishes 15 minutes after the beginning of the filling of the reservoir.

With the present invention, the elevation of the liquid level occurs rapidly. A slow flow rate (of effluent) is observed in the first minute, and such is due to the closing of the flapgate. The reservoir accumulates a liquid which flows toward an effluent at a flow rate of about 2,75 L/min or less. Once the hydraulic event terminates, the level decreases and causes the flapgate to open in the 21st minute of the experiment. The waste is expelled through the lower orifice until the level returns at its original height, which occurs at the 50th minute. The non-regulated hydraulic event which lasted 15 minutes with a peak flow rate of above 31 L/min, became, when regulated, an event that lasted 50 minutes with a peak flow never exceeding 2.75 L/min.

Table 1 shows the effect of the outflow regulator on a septic tank suspended solids discharge under a 100 L hydraulic event.

TABLE 1

Effect of the outflow regulator on a septic tank suspended solids discharge under a 100L hydraulic event

| Condition | N (number of trials) | Suspended solids discharge (mg) average | Std deviation |
|---|---|---|---|
| Without outflow regulator | 8 | 11900 | 1600 |
| With outflow regulator | 8 | 8300 | 1100 |
| Suspended solids reduction (%) | | 30% | — |

Although preferred embodiments of the present invention have been described in detail herein and illustrated in the accompanying drawings, it is to be understood that the invention is not limited to this precise embodiment and that various changes and modifications may be effected therein without departing from the scope or spirit of the present invention.

What is claimed is:

1. An outflow regulator for a gravity-fed liquid outlet of a liquid reservoir, the liquid outlet being located in the reservoir so as to be crossed by a liquid effluent flowing in a generally horizontal direction from an upstream side of the outlet to a downstream side, the outflow regulator comprising:
    a) a restriction plate mountable within the liquid outlet for limiting a flow rate of the effluent, the restriction plate comprising at least two orifices, comprising:
        i) a lower orifice allowing a first passage for the effluent when a first predetermined level of liquid is reached within the liquid reservoir; and
        ii) an upper orifice located above the first orifice and allowing a second passage for the effluent when a second predetermined level of liquid is reached within the reservoir; and
    b) a closure device comprising:
        i) a flapgate on the downstream side of the restriction plate, the flapgate being pivotable between a closed position where the flapgate covers the lower orifice of the restriction plate and an opened position away from the restriction plate, the flapgate including an opening facing the upper orifice of the restriction plate when the flapgate is in the closed position; whereby the flapgate, in the closed position, closes the first passage and leaves the second passage free; and
        ii) a float counterweight operatively connected to the flapgate to urge the flapgate towards the opened position when the liquid level in the reservoir is lower than said second predetermined level and causing the flapgate to move to the closed position when the liquid level in the reservoir reaches the second predetermined level.

2. The outflow regulator according to claim 1, wherein the float counterweight comprises a lever extending substantially at right angle to the flapgate, the lever having a downstream end portion secured to a top portion of the flapgate and an upstream end portion provided with a float.

3. The outflow regulator according to claim 2, wherein the restriction plate is provided with a pair of spaced-apart projecting arms projecting from said upper end portion of the restriction plate on the downstream side thereof, the liner having an extension pivotally connected between said projecting arms.

4. The outflow regulator according to claim 1, wherein the flapgate is pivotally mounted to an upper end portion of the restriction plate.

5. The outflow regulator according to claim 1, comprising a hollow adapter sized to snugly fit within the liquid outlet of the reservoir, for mounting the restriction plate within the liquid outlet.

6. The outflow regulator according to claim 5, wherein the adapter has an inner wall provided with a peripheral rim, the restriction plate having a peripheral edge mounted against said peripheral rim.

7. The outflow regulator according to claim 5, comprising an overflow passage located over the upper end portion of the restriction plate.

8. A combination of an outflow regulator according to claim 5, with a filter unit for filtering an effluent in a gravity-fed liquid outlet of a liquid reservoir, the outflow regulator having an inlet sealingly connectable to an outlet of the filter unit.

9. A filter unit for filtering an effluent, the filter unit comprising:
    a) a liquid inlet for receiving liquid to be filtered;
    b) a filter chamber in communication with the liquid inlet for filtering the liquid;
    c) a liquid outlet in communication with the filter chamber, from which the filtered liquid exit; and
    d) an outflow regulator as defined in claim 1, mounted within the liquid outlet.

10. The outflow regulator according to claim 5, wherein the hollow adapter is a hollow cylinder.

11. The outflow regulator according to claim 1, wherein the flapgate is mounted on the restriction plate.

12. The outflow regulator according to claim 1, wherein the flapgate is pivotally mounted to a rod extending over the restriction plate.

13. The outflow regulator according to claim 6, wherein the flapgate is pivotally mounted to a rod extending over the restriction plate, the rod being connected to the inner wall of the adapter.

14. The outflow regulator according to claim 1, which is configured for conduits having a 100 mm diameter.

15. The outflow regulator according to claim 1, wherein the orifices are located 30 mm from one another.

16. The outflow regulator according to claim 1, wherein the restriction plate comprises more than two orifices.

* * * * *